United States Patent [19]
Karrenbauer et al.

[11] 4,439,361
[45] Mar. 27, 1984

[54] PROCESS FOR CONTROLLING DIAZOTIZATION REACTIONS INVOLVING NITROUS REACTANT BY TESTING THE AIR ABOVE THE REACTION BATCH FOR ITS CONTENT OF NITROUS GASES AND FEEDING NITROUS REACTANT IN ACCORDANCE WITH SAID CONTENT

[75] Inventors: Kurt Karrenbauer; Hartmut Behringer, both of Erftstadt; Heinrich Rehberg, Hürth-Hermülheim, all of Fed. Rep. of Germany

[73] Assignee: Hoechst Aktiengesellschaft, Fed. Rep. of Germany

[21] Appl. No.: 344,487

[22] Filed: Feb. 1, 1982

[30] Foreign Application Priority Data

Feb. 7, 1981 [DE] Fed. Rep. of Germany ....... 3104375

[51] Int. Cl.³ .......................................... C07C 113/04
[52] U.S. Cl. .................................................... 260/141
[58] Field of Search ..................................... 260/141 P

[56] References Cited

U.S. PATENT DOCUMENTS

| | | | |
|---|---|---|---|
| 4,020,051 | 4/1977 | Herkes | 260/141 X |
| 4,233,213 | 11/1980 | Breig et al. | 260/141 P |
| 4,234,478 | 11/1980 | Atherton et al. | 260/141 P |
| 4,246,171 | 1/1981 | Hamilton et al. | 260/141 P |
| 4,268,437 | 5/1981 | Behringer et al. | 260/141 P |

FOREIGN PATENT DOCUMENTS

| | | | |
|---|---|---|---|
| 2635778 | 2/1977 | Fed. Rep. of Germany ... | 260/141 P |
| 6910541 | 1/1971 | Netherlands .................... | 260/141 P |

*Primary Examiner*—Floyd D. Higel
*Attorney, Agent, or Firm*—Connolly and Hutz

[57] ABSTRACT

The disclosure relates to a process for controlling diazotization reactions. To this end, a reaction batch containing an aromatic amine and nitrous acid is vigorously agitated so as to continuously renew the surface area of the batch. The air above said surface area is exhausted at a constant rate and tested for its content of nitrous gases originating from partially decomposed nitrous acid. Nitrous acid or dissolved matter forming it under the reaction conditions is supplied to the feed amine in the proportions necessary to provide for a content between 5 and 300 ppm nitrous gases in the exhausted air.

11 Claims, No Drawings

PROCESS FOR CONTROLLING DIAZOTIZATION REACTIONS INVOLVING NITROUS REACTANT BY TESTING THE AIR ABOVE THE REACTION BATCH FOR ITS CONTENT OF NITROUS GASES AND FEEDING NITROUS REACTANT IN ACCORDANCE WITH SAID CONTENT

The present invention relates to a process for controlling diazotization reactions.

Diazonium salts or bis-diazonium salts are made by reacting a primary aromatic amine with nitrous acid or, e.g., with sodium nitrite in the presence of one or more acids.

On account of the instability of a good deal of diazonium salts, the reaction is frequently carried out at temperatures of 0° to 15° C., the reaction heat being abstracted by cooling. At the end point of the diazotization reaction, nitrous acid may be found to be present in a minor excess just sufficient to effect the blue coloration of a potassium-iodide-starch paper.

As to nitrous acid in excess, it is possible for it to be consumed by the addition of further minor proportions of fresh amine (this operation is known as "balancing") or to be destroyed by means of urea or aminosulfonic acid.

The presence of nitrous acid in excess in the diazonium salt solution often affects the stability of the diazonium salts and also their use in the production of azo dyestuffs and azo pigments which are made by coupling reactions.

Various methods which are concerned with the determination of the content of nitrous acid in the reaction solution have been developed in order to facilitate the determination of the end point and ensure the controlled presence of an optimum excess of nitrous acid during the reaction phase, which often takes several hours in discontinuous and continuous commercial operations.

These processes are based on the metering of the redox or total potential by means of a platinum/calomel metering chain (DE-PS No. 960 205), on a polarovoltic control of nitrite addition (DE-OS No. 26 35 778), or on the use of an analyzer indicating the concentration of nitrous acid in the reaction mixture (DE-OS No. 26 17 913).

All these metering operations which are effected in the diazonium salt solution suffer from the deficiency that the results metered for one reactant or other become affected by unreacted amine blocking feed inlets, or undergoing side reactions.

In addition to this, defective potentials always occur whenever layers of decomposed diazonium salt commence forming on the electrodes. Still further, as a result of the reactant's concentration decreasing towards the end point of the reaction, the potential becomes unduly low whereby the determination of the end point is rendered difficult.

We have now unexpectedly found that those nitrous gases which are present in the gas space above the diazonium salt solution and are in concentration-responsive equilibrium with the nitrous acid in said solution are a simple yet reliable index which can be relied upon in controlling the diazotization and determining the end point.

We have also unexpectedly found that even in the event of the nitrous acid being present in the low total concentration of less than 0.1%, for example, which is normal in the diazotization of aromatic amines, especially towards the end of the reaction, it is possible for such minimum variations in the nitrous acid concentration as, e.g., of 0.3%, to effect readily measurable variations of a magnitude of about 30 ppm $NO_x$ ($x$=fractional number between 1 and 2) above the reaction space. To this end, it is however necessary by means of an agitator to provide for a regular concentration of acid everywhere in the solution which is to be tested, and for the surface area of the latter to be continuously renewed.

Even a minor variation in the nitrous acid concentration effects, within seconds, a variation of the content of nitrous gases in the gas space above the solution, which can be measured and recorded at once as described in prior art. This makes it possible for the further course of the reaction to be automatically controlled so as to ensure the presence just of minor regular excess proportions of nitrous acid in the reaction solution. As a result, the environment is subjected to minimum pollution by nitrous gases, and it is possible for the reaction to be terminated with the greatest accuracy possible. This process has proved highly beneficial in the treatment of amines which undergo diazotization relatively reluctantly; indeed, the process enables the presence of relatively large excess proportions of nitrous acid to be obviated, yet permits the diazotization to be effected at satisfactory velocity, and with high yields. Tested in the process of this invention is not only the concentration of the nitrous gases in the gas space above the reaction zone but also the time-responsive decrease of the latter in said zone whenever the diazotization velocity is found to decrease as a result of the decreasing concentration of amine in the preparing vessel, in the event of the reaction being effected batchwise. In the event of the diazotization batch being admixed portionwise with sodium nitrite, the decrease in the concentration of nitrous gas from a predetermined upper to a predetermined lower value has been found to take place within a given period of time outside which the diazotization reaction can scarcely be said to still occur, and the reaction is indeed practically terminated. By observing such predetermined limiting values, it is possible to increase the yield and, in this way, to facilitate an ecologically beneficial disposal of material which remains unreacted during diazotization.

The present invention relates more particularly to a process for controlling diazotization reactions, which comprises: vigorously agitating a reaction batch containing an aromatic amine and nitrous acid, and thereby continuously renewing the surface area of the batch; exhausting the air above said surface area at a constant rate; testing the exhausted air for its content of nitrous gases originating from partially decomposed nitrous acid; and supplying nitrous acid or dissolved matter forming nitrous acid under the reaction conditions to the feed amine in the proportions necessary to provide for a content between 5 and 300 ppm, preferably 10 to 150 ppm, nitrous gases in the exhausted air.

Further preferred features of the present process which can be used at will provide:
(a) for the supply of nitrous acid or dissolved matter forming the acid under the reaction conditions to be automatically arrested once the content of nitrous gases in the exhausted air has reached a preselected upper limiting value between 75 and 300 ppm;
(b) for the supply of nitrous acid or dissolved matter forming the acid under the reaction conditions to be automatically resumed once the content of nitrous gases in the exhausted air has reached a preselected lower limiting value between 5 and 45 ppm;

(c) for the supply of nitrous acid or dissolved matter forming the acid under the reaction conditions to be automatically resumed partially once the content of nitrous gases in the exhausted gas is below the upper limiting value, and to be resumed completely once the lower limiting value has been reached;

(d) for the end point of the diazotization of the aromatic amine to be indicated by a time interval of 1 to 60 minutes, preferably 1 to 30 minutes, which is typical of the amine and during which the concentration of the nitrous gases decreases from the upper limiting value to the lower limiting value;

(e) for the upper limiting value to lie at 100 ppm, for the lower limiting value to lie at 10 ppm, and for the time interval determining the end point of the diazotization, during which the concentration decreases from the upper limiting value to the lower limiting value, to comprise 3 to 30 minutes;

(f) for the nitrous acid or dissolved matter forming it under the reaction conditions to be supplied over a period of 10 minutes to 6 hours;

(g) for an aqueous solution of sodium nitrite to be used as the matter forming nitrous acid; and (h) for the content of nitrous gases to be tested in merely a portion of the air exhausted above the reaction batch.

EXAMPLE 1

336 kg 5-nitro-2-aminoanisole (2.0 mols) was suspended in 3000 l water with 530 l hydrochloric acid (31% strength). The suspension was cooled down to +5° C. by the addition of ice and admixed with altogether 264 l of a 40% solution of sodium nitrite in water (feed rate=400 l/h). By the addition of further ice, the temperature was maintained between +5° C. and +7° C. During the diazotization, the whole was vigorously agitated. The air above the preparing vessel was exhausted at a rate of 2000 m$^3$/h, and tested for its content of nitrous gases, determined as NO$_2$. As soon as the exhausted air was found to contain more than 80 ppm, the supply of sodium nitrite solution was arrested. The supply of further sodium nitrite solution to the reactor was resumed as soon as the exhausted gas was found to contain less than 40 ppm nitrous gases. The reaction and diazotization were complete once it took more than 15 minutes for the content of nitrous gases to decrease from 80 ppm to 40 ppm. The yield was almost complete and the total reaction period was about 2 hours.

Just a slight excess of sodium nitrite was found to be contained in the diazonium salt solution which could accordingly be used in coupling reactions, after filtration.

EXAMPLE 2

1600 kg 3-nitro-4-aminotoluene was suspended in 2500 l water and 3300 l hydrochloric acid (31% strength), the whole was cooled by the addition of ice and diazotized by the introduction of sodium nitrite solution (40% strength).

At the onset of the diazotization reaction, 150 l sodium nitrite solution was supplied at a feed rate of 500 l/h, the next 1100 l at a feed rate of 1000 l/h and the balance at a feed rate of 250 l/h. During the reaction, the material in the reactor was vigorously agitated and the temperature was maintained at less than 10° C. by the addition of further ice. The air above the liquid surface was exhausted at a rate of 2500 m$^3$/h and a portion thereof was tested for its content of nitrous gases, determined as NO$_2$.

The supply of sodium nitrite solution was stopped once the content of nitrous gases was found to exceed a value of 80 ppm. Once this value had dropped to less than 80 ppm, the supply was resumed so as to reach the desirable feed rate at a content of 40 ppm.

In the event of the feed valve being fully closed during the end phase of the reaction as a result of the reaction velocity being very low due to the low concentration of the reactants, the reaction end is indicated by the time which is needed for the concentration of the nitrous gases in the exhausted air to drop from 80 ppm to 40 ppm. If the decrease takes more than 25 minutes, the reaction is practically complete.

After 6 hours, 1385 l sodium nitrite solution was found to have been consumed and 99% of unground 3-nitro-4-aminotoluene was found to have been diazotized.

We claim:

1. A process for controlling diazotization reactions, which comprises: vigorously agitating a reaction batch containing an aromatic amine and nitrous acid, and thereby continuously renewing the surface area of the batch; exhausting the air above said surface area at a constant rate; testing the exhausted air for its content of nitrous gases originating from partially decomposed nitrous acid; and supplying nitrous acid or dissolved matter forming nitrous acid under the reaction conditions to the feed amine in the proportions necessary to provide for a content between 5 and 300 ppm nitrous gases in the exhausted air.

2. A process as claimed in claim 1, wherein the supply of nitrous acid or dissolved matter forming the acid under the reaction conditions is automatically arrested once the conent of nitrous gases in the exhausted air has reached a preselected upper limiting value between 75 and 300 ppm.

3. A process as claimed in claim 2, wherein the supply of nitrous acid or dissolved matter forming the acid under the reaction conditions is automatically resumed once the content of nitrous gases in the exhausted air has reached a preselected lower limiting value between 5 and 45 ppm.

4. A process as claimed in claims 2 and 3, wherein the supply of nitrous acid or dissolved matter forming the acid under the reaction conditions is automatically resumed partially once the content of nitrous gases in the exhausted air is below the upper limiting value and resumed completely once the lower limiting value has been reached.

5. A process as claimed in claim 1, wherein the end point of the diazotization of the aromatic amine is indicated by a time interval of 1 to 60 minutes, which is typical of the respective amine and during which the concentration of the nitrous gases decreases from the upper limiting value to the lower limiting value.

6. A process as claimed in claim 5, wherein the upper limiting value is 100 ppm, the lower limiting value is 10 ppm, and the time interval determining the end point of the diazotization, during which the concentration decreases from the upper limiting value to the lower limiting value, is 3 to 30 minutes.

7. A process as claimed in claim 1, wherein the nitrous acid or dissolved matter forming it under the reaction conditions is supplied over a period of 10 minutes to 6 hours.

8. A process as claimed in claim 1, wherein an aqueous solution of sodium nitrite is used as the matter forming nitrous acid.

9. A process as claimed in claim 1, wherein the content of nitrous gases is tested in merely a portion of the air exhausted above the reaction batch.

10. A process as claimed in claim 1, wherein the principal reactants for the diazotization reaction consist essentially of a primary aromatic amine and nitrous acid or an aqueous solution containing a dissolved nitrous acid-forming material.

11. A process as claimed in claim 10, wherein the aqueous solution comprises a solution of sodium nitrite, and the diazotization reaction is carried out in the presence of at least one acid.

* * * * *